United States Patent
Drobe et al.

(10) Patent No.: US 8,282,210 B2
(45) Date of Patent: Oct. 9, 2012

(54) PRODUCTION OF A NOVEL PROGRESSIVE GLASSES LENS

(75) Inventors: Bjorn Drobe, Charenton le Pont (FR); Claude Pedrono, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 168 days.

(21) Appl. No.: 12/921,616

(22) PCT Filed: Mar. 13, 2009

(86) PCT No.: PCT/FR2009/050421
§ 371 (c)(1), (2), (4) Date: Sep. 9, 2010

(87) PCT Pub. No.: WO2009/122073
PCT Pub. Date: Oct. 8, 2009

(65) Prior Publication Data
US 2011/0001925 A1    Jan. 6, 2011

(30) Foreign Application Priority Data
Mar. 14, 2008 (FR) ..................... 08 51659

(51) Int. Cl.
*A61B 3/10* (2006.01)
*G02C 7/06* (2006.01)
(52) U.S. Cl. .......... 351/204; 351/205; 351/177
(58) Field of Classification Search .......... 351/200–246, 351/159–177
See application file for complete search history.

(56) References Cited

U.S. PATENT DOCUMENTS 8,061,838 B2 * 11/2011 Giraudet et al. .............. 351/169
8,157,376 B2 *  4/2012 Drobe ...................... 351/159.74

FOREIGN PATENT DOCUMENTS

| EP | 1830223 | 9/2007 |
|---|---|---|
| EP | 1950601 | 7/2008 |
| WO | 01/62139 | 8/2001 |
| WO | 2006/054985 | 5/2006 |
| WO | 2007/068818 | 6/2007 |
| WO | 2007/068819 | 6/2007 |

OTHER PUBLICATIONS

Schuldt, Stefanie. "ysis—Natürliches Sehen erleben" *Deutsche Optiker Zeitung*. pp. 38-43. (May 1, 2004) XP-002398937.

* cited by examiner

*Primary Examiner* — Mohammed Hasan
(74) *Attorney, Agent, or Firm* — Occhiuti Rohlicek & Tsao LLP

(57) ABSTRACT

The invention relates to a method for producing a novel progressive glasses lens intended for a presbyopic wearer, which takes into account the postural habits of the wearer, acquired through prior conditions of ophthalmic correction. A design for the novel progressive lens is established by modifying a reference lens in compliance with an aptitude of the wearer to modify his/her postural habits. To this end, variations in a postural parameter are determined using measurements of said parameter, which are carried out on the wearer. The invention enables the reduction of a period of habituation by the wearer to the novel progressive glasses lens.

13 Claims, 3 Drawing Sheets

PRODUCTION OF A NOVEL PROGRESSIVE GLASSES LENS

CROSS-REFERENCE TO RELATED APPLICATIONS

This application is the National Stage of International Application No. PCT/FR2009/050421, filed on Mar. 13, 2009, which claims the priority of French Application No. 0851659 filed on Mar. 14, 2008, the contents of which are incorporated herein by reference in their entirety.

FIELD OF THE INVENTION

The present invention concerns a method of producing a new progressive spectacle eyeglass.

BACKGROUND OF THE INVENTION

As it is known, a progressive spectacle eyeglass compensates for insufficient accommodation of a wearer of this eyeglass, when said wearer is looking at objects that are situated at variable distances. For this purpose, the progressive eyeglass has an optical power that varies for different directions of gaze. More precisely, the progressive eyeglass has, at each point thereon corresponding to a direction in which the wearer is looking, an optical power that is adapted so that the wearer sees sharply an object situated in this direction at a given distance. Thus the wearer benefits from optimum vision through a progressive eyeglass if he acquires the reflex of observing the object through an appropriate part of the eyeglass, depending on the distance of this object. This reflex consists of spontaneously adapting the position of his head, essentially the vertical inclination of his head, so that the direction of his gaze passes substantially through the eyeglass at the point where the optical power is suited to the distance of the object.

When a wearer uses the same progressive eyeglass for a sufficiently long time, he has acquired a reflex for moving his head according to the distance of the object that he is observing, spontaneously integrating the particular variation in the optical power of this eyeglass. This variation in optical power parallel to the eyeglass, which is also referred to as the design of the eyeglass, is characterised by several parameters, including the progression length and the function of variation of the optical power along the meridian line of the eyeglass. This design may change between different progressive eyeglasses although these correspond to the same ophthalmic prescription. For this reason a wearer who is already equipped with an initial progressive eyeglass may need a period of habituation to adapt to a new progressive eyeglass, only because of the difference in design between the two eyeglasses.

In fact, every person has a reflex for spontaneously inclining his head according to the distance of an object that he is observing, even if he is not wearing spectacles. Such a reflex stems in particular from a physical posture that is more comfortable and causes less fatigue when it is maintained. The inclination of the head that is thus adopted by everyone when he is looking at an object in a fixed direction and at a fixed distance therefore varies between different persons. For this reason, a new wearer of progressive eyeglass, equipped with such an eyeglass for the first time, may also experience a problem when the design of this eyeglass does not correspond to his initial head inclination reflex.

Moreover, the inventors have observed that some people precisely incline their head according to the location of the object that they are looking at. In other words, they successively adopt positions for the head that are identical when they are looking at the same object successively under the same conditions.

Conversely, other people adopt head positions that vary for observation conditions that remain identical. In other words, these latter persons do not adopt again the same position of their head when they are looking at the same object under the same conditions at two different times.

SUMMARY OF THE INVENTION

An object of the present invention is therefore to supply a progressive spectacle eyeglass to a wearer, with reducing any problem that he might experience during a period of habituation to this eyeglass.

For this purpose, the invention proposes a method of producing a new progressive spectacle eyeglass that is intended for a longsighted wearer, this method comprising the following steps:

/1/ obtaining a characterisation of a reference eyeglass that is compatible with an ophthalmic prescription drawn up for the wearer, this reference eyeglass having a design that corresponds to a reference value of at least one postural parameter having variable values for distinct observation positions adopted by the wearer;

/2/ when the wearer is under ophthalmic correction conditions that were usual before the new progressive eyeglass is produced, measuring values of the postural parameter for this wearer during successive placements in observation position;

/3/ calculating a mean Pmean and a standard deviation SD of the values measured at step /2/, and a corrected mean Pcorr for these values measured in accordance with the formula:

$$Pcorr = Pmean - (Pmean - Pref) \times SD/K$$

Pref designating the reference value of the postural parameter and K being a non-zero constant;

/4/ depending on the corrected mean Pcorr calculated at step /3/, determining a design for the new progressive eyeglass; and /5/ producing the new progressive eyeglass from the characterisation of the reference eyeglass, in accordance with the ophthalmic prescription and the design determined at step /4/.

In addition, according to a further feature of the invention, the reference value Pref of the postural parameter and the constant K are respectively a mean value and a standard deviation of values of the postural parameter that are determined for a population sample.

In the context of the present invention, postural parameter means a parameter that concerns the position, or posture, adopted by the wearer during a visual observation. A postural parameter is therefore by nature different from a geometric parameter of the eyeglass, from a geometric parameter that characterises the wearing of the eyeglass on the face of the wearer, fixed by the spectacle frame, and also from a physiological parameter of the wearer.

Thus, according to the invention, the new progressive ophthalmic eyeglass that is supplied to the longsighted wearer is produced by taking into account measurements that are performed for by this wearer. The new eyeglass is therefore personalised, in addition to the characteristics of the ophthalmic prescription, according to the observation postures of the wearer. Therefore equipping the wearer with the new eyeglass does not force the wearer to modify his postural habits quickly. The wearer therefore experiences no problem, discomfort or fatigue during the change in ophthalmic correction, which might result from a need for him to adopt different observation positions. For example, the production of an eyeglass according to the method of the invention can avoid that he has to modify the inclination of his chest or the height of his hands when he is reading a book using the new progressive eyeglass, compared with a habit that he acquired with the ophthalmic correction conditions that were his previously.

More precisely, the invention improves the comfort of the wearer of the new progressive eyeglass by procuring for him a personalised design that achieves a compromise between the postural habits of the wearer and a fixed reference design. Such a compromise is particularly suitable for producing the new eyeglass from a reference eyeglass that is mass-produced. The personalisation can then be added during a reworking treatment of the reference eyeglass, after the measurements of the postural parameter have been performed for the wearer for whom the new spectacle eyeglass is intended.

The invention also reduces any difficulty in habituation of the wearer to the new progressive eyeglass.

According to a particularly advantageous feature of the invention, the new progressive eyeglass is personalised according to a spontaneous aptitude, or facility, for the wearer to modify his posture for fixed observation conditions, for example for conditions of reading a book. This aspect of the invention results from step /3/, according to which variations in posture that are adopted by the wearer are characterised. Such variations indicate, when they are significant, that the wearer may easily modify his postural habit when he uses the new progressive eyeglass. This new eyeglass can then be optimised on criteria other than the maintenance of identical observation postures of the wearer. On the other hand, slight variations for the values of the postural parameter that are measured for the wearer indicate that the latter could experience a problem or a certain degree of discomfort in changing his habitual positions. The method of the invention favours such a wearer keeping his postural habits.

More precisely, the aptitude of the wearer for modifying his posture during visual observations is characterised by the standard deviation of the results of the measurements of the postural parameter that are performed for the wearer. This standard deviation that is calculated for the wearer is compared with a standard deviation calculated for a population sample. The mean of the values of the postural parameter that are measured for the wearer is then corrected from the mean value established from the population sample, according to the standard deviations calculated respectively for the wearer and for the population sample. The corrected mean is used to determine the design of the new progressive eyeglass that is allocated to the wearer.

The invention can be implemented both for a wearer who is equipped for the first time with a spectacle eyeglass, and for a wearer who is already equipped initially with a spectacle eyeglass. In the first case, when the new progressive eyeglass is a first spectacle eyeglass for the wearer, the values of the postural parameter are measured in step /2/ when the wearer is not equipped with any spectacle eyeglass.

In the second case, when the wearer is already equipped with an initial spectacle eyeglass before the new progressive eyeglass is produced according to the present invention, this new progressive eyeglass is intended to replace the initial eyeglass. The ophthalmic correction conditions that are used in step /2/ for measuring the values of the postural parameter then correspond to the use of the initial eyeglass by the wearer. In other words, these values of the postural parameter are measured when the wearer is equipped with the initial eyeglass. Thus, under such circumstances of change in spectacle eyeglass, from the initial eyeglass to the new progressive eyeglass, the invention avoids again the wearer having to suddenly modify his postural habits.

In addition, the invention can be implemented as well for a wearer who is equipped for the first time with a progressive eyeglass and for a wearer who was already equipped initially with a progressive eyeglass. In other words, the initial spectacle eyeglass of the wearer may itself already be a progressive eyeglass, or not. In the latter case, the initial eyeglass may be a unifocal eyeglass. In all cases, the method of the invention avoids forcing the wearer to correct his initial posture reflex, at least with regard to raising or lowering his head according to the distance of an object that he is observing.

For clarity reasons of the remainder of the description, the latter refers to a prior use of an initial spectacle eyeglass by the wearer that is intended to be replaced by the new progressive eyeglass produced according to the invention. However, the invention naturally also comprises the case of a wearer who is equipped with a spectacle eyeglass for the first time. Such a situation is covered by the description of the invention that is given below considering that the prior ophthalmic correction conditions of the wearer correspond to the absence of any initial eyeglass.

Finally, the characterisation of the reference eyeglass that is obtained in step /1/ may be that of a non-real eyeglass defined numerically. Such a numerical characterisation may comprise the supply of geometric parameters of the non-real eyeglass. These parameters may in particular be curvature values or sagittal height values that are attributed to points on a mesh on a surface of the eyeglass. In this case, step /5/ of producing the new progressive eyeglass may consist of creating the two faces of the eyeglass in a blank block of transparent material.

Alternatively, the reference eyeglass that is characterised in step /1/ may relate to a semi-finished eyeglass, but not necessarily. Such a semi-finished eyeglass may have a final face, for example the anterior face thereof. In this case, the new progressive eyeglass is produced in step /5/ by machining the other face of the semi-finished eyeglass. Advantageously, the final face of the semi-finished eyeglass may be complex, i.e it may have variations in curvature, so that the final machining of the other face is simplified.

BRIEF DESCRIPTION OF THE DRAWINGS

Other particularities and advantages of the present invention will arise from the following description of non-limitative example embodiments with reference to the accompanying drawings, in which.

DETAILED DESCRIPTION

Figure 1:
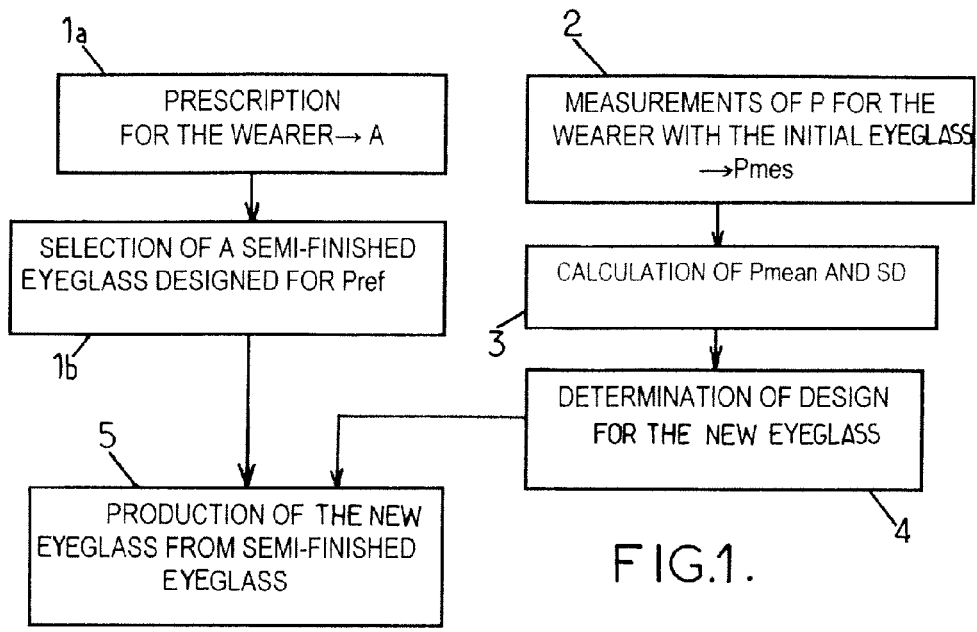
FIG. 1 is a block diagram of steps of a method according to the invention.

In accordance with step 1a of FIG. 1, an ophthalmic prescription is first drawn up for the longsighted wearer. This prescription indicates in particular an addition value A, which corresponds to the difference in optical power that the eyeglass must have between two directions of looking through it, respectively for close vision and for far vision. In a known manner, this difference in the optical power is determined so as mitigate the insufficiency of accommodation of the eye of the wearer, in order to maintain a sharp image on his retina when he is looking successively at an object that is far away and an object that is close.

The finished ophthalmic eyeglass that is supplied to the wearer may be produced in two main steps. First, a series of semi-finished eyeglasses may be made available, which correspond to different values of the addition A. For this purpose, each semi-finished eyeglass has a final surface, which may be that of the anterior face of the eyeglass, its posterior face, or an intermediate interface situated between anterior and posterior faces. This final surface, with variable curvature, provides the finished eyeglass with the addition value after the other surface or surfaces have been machined according to their final shapes. One of these semi-finished eyeglasses is then selected, in accordance with the addition value A that is prescribed for the wearer (step 1b).

As is also known, the series of semi-finished eyeglasses may be indexed simultaneously by the addition values A and by values of another parameter, called the base value. The base value of a semi-finished eyeglass characterises the mean curvature of the final anterior face of this semi-finished eyeglass, for the far vision direction. It is selected according to the optical power that is prescribed for the wearer and for far vision. The semi-finished eyeglass can therefore be selected in practice simultaneously according to the addition value A that is prescribed for the wearer and the base value that corresponds to the ophthalmic correction for far vision.

Figure 2:
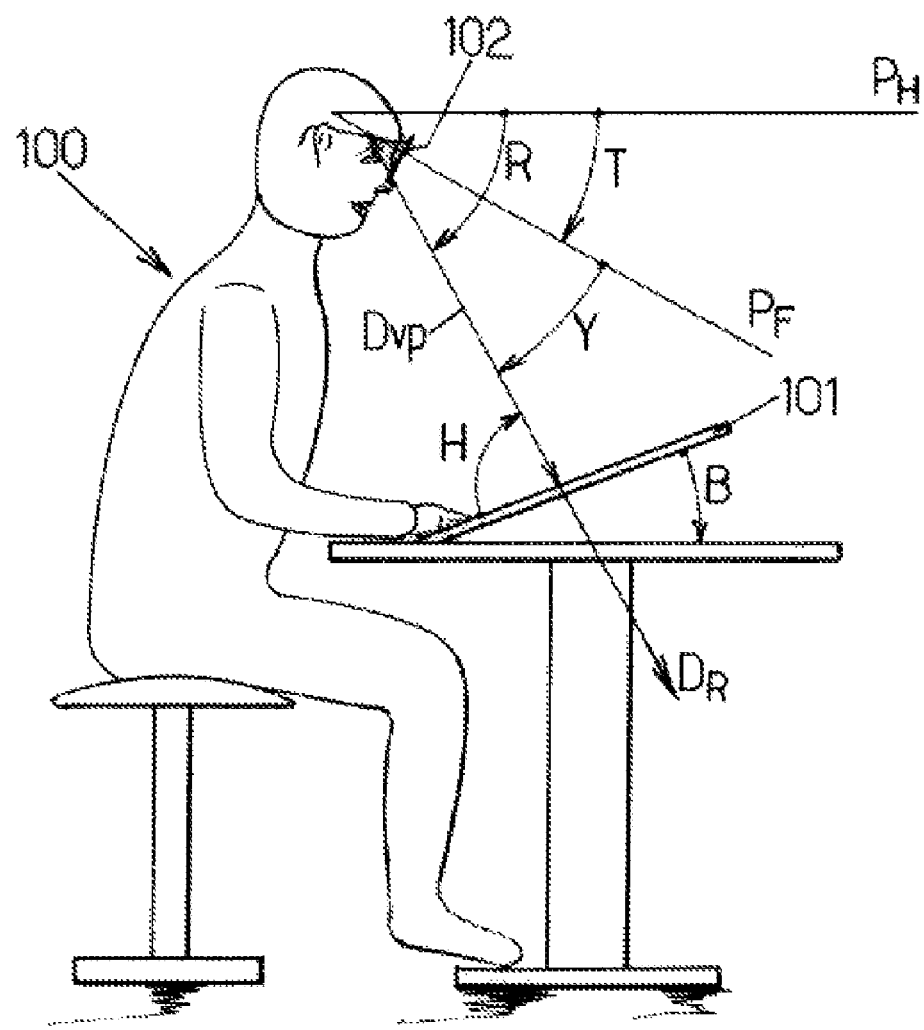
FIG. 2 illustrates various postural parameters of a spectacle eyeglass wearer.

Independently, postures of the wearer are characterised, for example when the latter is observing a given object under close vision conditions (step 2). These postures may concern a particular activity of the wearer, for which it is wished for the pair of spectacles to be more particularly suited. For example, the postures of the wearer may concern the observation of a display screen of a computer unit, or reading a book, referred to as a document hereinafter. FIG. 2 illustrates the definitions of several postural parameters that may be chosen to implement the present invention. The notations that are used in this figure are as follows:

$P_F$ designates the Francfort plane that indicates the vertical inclination of the head, $P_H$ is a horizontal reference plane, T is the vertical angle of inclination of the head, measured in a vertical plane between the planes $P_H$ and $P_F$, $D_R$ designates the direction of gaze of the wearer referenced 100, R is the angle of lowering of the gaze, measured in a vertical plane between the plane $P_H$ and direction $D_R$, Y is the angle of elevation or lowering of the eyes, measured in a vertical plane between the plane $P_F$ and the direction $D_R$, B is the angle of inclination of the document 101 that is being read by the wearer 100, measured in a vertical plane between a horizontal plane and the plane of the document 101, H, called the horopter, is the angle measured in a vertical plane between the plane of the document 101 and the direction $D_R$, and Dvp is the reading distance in near vision, measured along the direction $D_R$ between the eyes of the wearer 100 and the place of the document 101 that is being read.

These various parameters that characterise the posture of the wearer 100 are assumed to be known to persons skilled in the art and the definitions thereof are not repeated in detail here. For this purpose reference can be made to the documents WO 2007/068818 or WO 2007/068819 in particular. These parameters can be measured for example by equipping the wearer 100 and the document 101 with visual markers that are located on photographs taken when the wearer places himself in the reading position. To characterise values of these parameters statistically, the wearer 100 is placed in the reading position and a series of measurements are made. Alternatively, the wearer 100 can place himself in the reading position in successive times, for example after having stood up between two successive placements, and the positions of the markers are noted for each occasion. For each placement, values of at least one of the postural parameters cited above are measured. These measured values are denoted Pmes. Optionally, the values Pmes that are measured for each placement of the wearer 100 may relate to several of the previous parameters, or be derived from at least some of these. For example, the postural parameter chosen may be a ratio Gt of participation of the head of the wearer 100 to a vertical gaze movement, defined by Gt=T/R. The reader will understand that other methods for measuring the postural parameter desired may be used alternatively. For this purpose, reference can be made to the known works that describe such methods.

A calculation is then made of a standard deviation SD of the measured values Pmes for the measurements performed in series for the wearer 100, or for the series of placements of the latter (step 3 in FIG. 1), according to the formula:

$$SD = \frac{1}{N} \times \sqrt{\sum_{i}^{N}(Pmes_i - Pmean)^2} \qquad (1)$$

where N is the number of placements made, i is the number of the placement corresponding to each measurement and Pmean is a mean of the measured values Pmes. In particular, it will be possible to calculate Pmean according to the following formula:

$$Pmean = \frac{1}{N} \times \sqrt{\sum_{i}^{N} Pmes_i} \qquad (2)$$

When the measurements of the postural parameter or parameters for the wearer 100 are performed, the wearer is equipped when applicable with his initial spectacle eyeglass 102 (FIG. 2). In this way, the values SD and Pmean that are calculated take into account any adaptation of the posture to the use of the eyeglass 102.

Obviously, when the wearer 100 is equipped with a spectacle eyeglass for the first time, the measurements are made when the wearer 100 is not wearing any spectacle eyeglass. It will be understood that the principle of the invention is to make the measurements of the postural parameter or parameters by placing the wearer 100 under observation conditions repeatedly, with or without initial eyeglass 102, which correspond to his previous habit.

The design of the new progressive eyeglass to be produced for the wearer 100 is then determined from the standard deviation SD that was calculated for this wearer, and also from the mean Pmean (step 4 of FIG. 1). Several alternative methods may be used in this regard, two of which are described below by way of examples.

Figure 3:
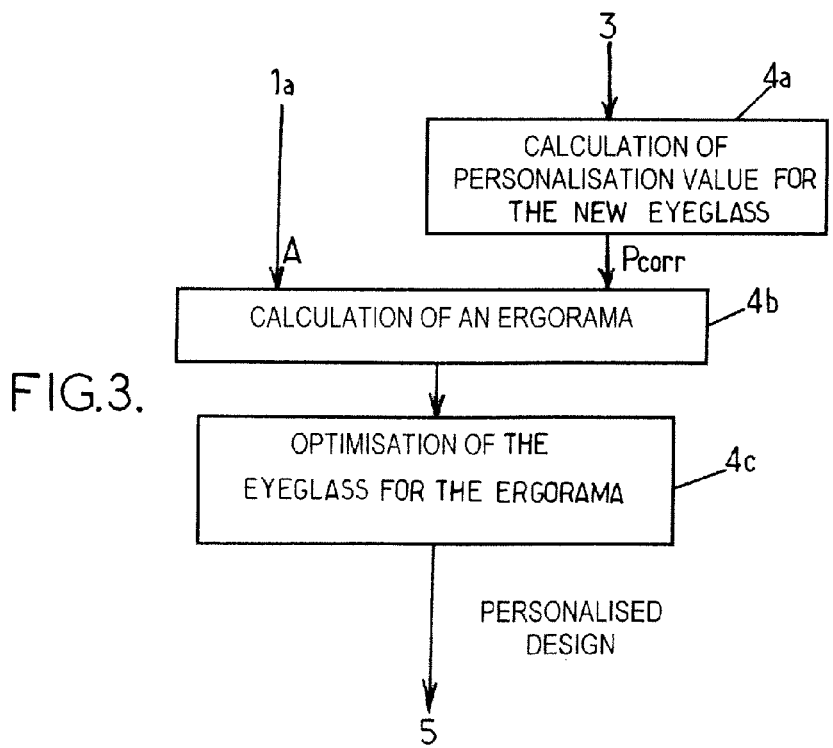
FIG. 3 is a block diagram of a variant of the method according to the invention.

In general, a value Pcorr is first calculated for the postural parameter, which is useful for then calculating or selecting the design of the new progressive eyeglass (step 4a of FIG. 3). This value Pcorr represents the personalisation of the new eyeglass. It is calculated for each wearer from a reference value Pref that is associated with the semi-finished eyeglass, and more generally with the reference eyeglass, which was selected in step 1b. It is given by the following formula:

$$P\text{corr} = P\text{mean} - (P\text{mean} - P\text{ref}) \times SD/K \quad (3)$$

where K is a non-zero constant. Thus the value Pcorr is equal to the mean Pmean of the values of the postural parameter measured for the wearer when these are only slightly dispersed, i.e. when their standard deviation SD is almost zero. Conversely, when the values measured for the wearer have a standard deviation that is close to the constant K, the corrected mean Pcorr becomes almost equal to the reference value Pref. In this regard, formula 3 effects a correction of the mean Pmean calculated for the wearer, based on the reference value Pref and the constant K, in an extent that depends on the repeatability of the posture adapted by the wearer.

For the implementation of the invention that is described here, where the reference eyeglass is a semi-finished eyeglass that is selected according to the addition value A that has been prescribed for the wearer, the value of Pref is associated with the design of the final face of the semi-finished eyeglass.

According to the invention, the reference value Pref and the constant K are determined statistically from a population sample. The statistical distribution of the values of the postural parameter that are measured successively for the wearer is therefore compared with a statistical distribution of the values of the same parameter determined over a set of persons.

Thus the reference value Pref corresponds to a mean value of the postural parameter that is determined from the population sample.

Simultaneously, the constant K is equal to a standard deviation of the values of the postural parameter that are determined for the persons of this population sample.

The population sample may be in particular a set of non-longsighted wearers that are placed in a near vision condition. These wearers in the population sample may optionally be equipped with unifocal eyeglasses adapted to their respective sights. In this case, the reference eyeglass that is selected in step 1b has a design which is adapted for a wearer who is equipped with a progressive eyeglass for the first time. The inventors then give the following examples for the values of Pref, depending on the postural parameter that is taken into consideration:

reference value Pref for the reading distance in near vision Dvp: 348 mm;
reference value Pref for the angle of lowering of the eyes in near vision Y: 22 degrees;
reference value Pref for the horopter H: 77.5 degrees; and
reference value Pref for the ratio of participation of the head in a vertical gaze movement Gt: 0.71.

Alternatively, the reference value Pref may also be determined over a set of wearers with at least some of them who may be longsighted. In this case, the reference design can initially be closer to the final design of the new progressive eyeglass that will be supplied to the wearer.

The reference value Pref may also be updated according to a change in the population sample that is used to establish this value. In this case, a method according to the invention may also comprise a prior step of updating the reference value Pref of the postural parameter that is considered. In particular this updating may be carried out on the basis of a new population sample that is increased compared with a prior population sample from which a reference value was established previously for the same postural parameter.

The first method of determining the design of the new progressive eyeglass that is reported here comprises the following two substeps:

determining an ergorama from the corrected value Pcorr (step 4b of FIG. 3); and
numerically optimising the new progressive eyeglass using at least part of the ergorama as an optimisation target (step 4c of FIG. 3).

For a precise definition of the ergorama, reference can be made to the document WO 2007/068819 already cited. It is merely repeated here that an ergorama associates an optical power value with each observation direction through the new progressive eyeglass to be produced. The ergorama is established by first associating a value of the observation distance with each gaze direction of the wearer through the eyeglass. This association is established from the personalised value Pcorr that is calculated for the postural parameter selected so as to take account of the spontaneous positionings of the wearer 100. The optical power value for each gaze direction is then derived from the prescription established for the wearer 100 and the observation distance for this direction. From the ergorama, the progressive eyeglass is optimised in a manner known to persons skilled in the art. The personalised design of the new progressive eyeglass is thus obtained.

According to the second method of determining the design of the new progressive eyeglass, this latter is selected from a set of designs that are indexed by values of the postural parameter, in accordance with the corrected value Pcorr. To reduce the time necessary for supplying the finished eyeglass to the wearer, these designs may have been calculated previously for a whole series of pairs of addition values A and postural parameters P, then stored on a suitable data recording medium. The design that corresponds to the addition values A and corrected mean values Pcorr that have been determined for the wearer whose spectacle eyeglasses are renewed is then read from the data medium.

Generally according to the invention, various features of the design of the new progressive eyeglass may vary according to the selection that takes into account the corrected mean Pcorr calculated for the wearer, for one and same addition value A. For example, the design of the new progressive eyeglass may comprise a progression length and/or a function of variation in the optical power along a meridian line of the new eyeglass, which is or are themselves variable according to the corrected mean Pcorr calculated from the values of the postural parameter measured for the wearer.

Table 1 below contains the reference values Pref and standard deviations K that were determined from a group of 108 non-longsighted wearers, for the three postural parameters of reading distance Dvp, horopter H and ratio of participation of the head to in a vertical movement of the gaze Gt, and for an activity of reading on a table:

TABLE 1

|  | Dvp (mm) | H(°) | Gt |
|---|---|---|---|
| Pref | 348 | 77.5 | 0.71 |
| K | 53.4 | 10.05 | 0.054 |

Table 2 below contains, for each of the three postural parameters of table 1 and for three different wearers for whom the prescribed addition values A are identical, equal to 2.00 dioptres, the mean of the measured values Pmean, the calculated standard deviation SD and the value Pcorr calculated according to formula 3:

TABLE 2

|  |  | Dvp (mm) | H (degrees) | Gt |
|---|---|---|---|---|
| Wearer 1 | Pmean | 440 | 61.1 | 0.43 |
|  | SD | 33.1 | 5.60 | 0.044 |
|  | Pcorr | 386 | 70.23 | 0.66 |
| Wearer 2 | Pmean | 367 | 65.56 | 0.63 |
|  | SD | 42.12 | 9.11 | 0.025 |
|  | Pcorr | 352 | 76.38 | 0.67 |
| Wearer 3 | Pmean | 432 | 51.9 | 0.41 |
|  | SD | 31.14 | 3.19 | 0.018 |
|  | Pcorr | 383 | 60.00 | 0.51 |

The values of SD that are indicated for the three wearers show that wearer 3 adopts reading postures that are more repetitive. For this reason, this wearer is liable to adapt with greater difficulty to a new progressive eyeglass with a design optimised for different postures.

Figure 4:
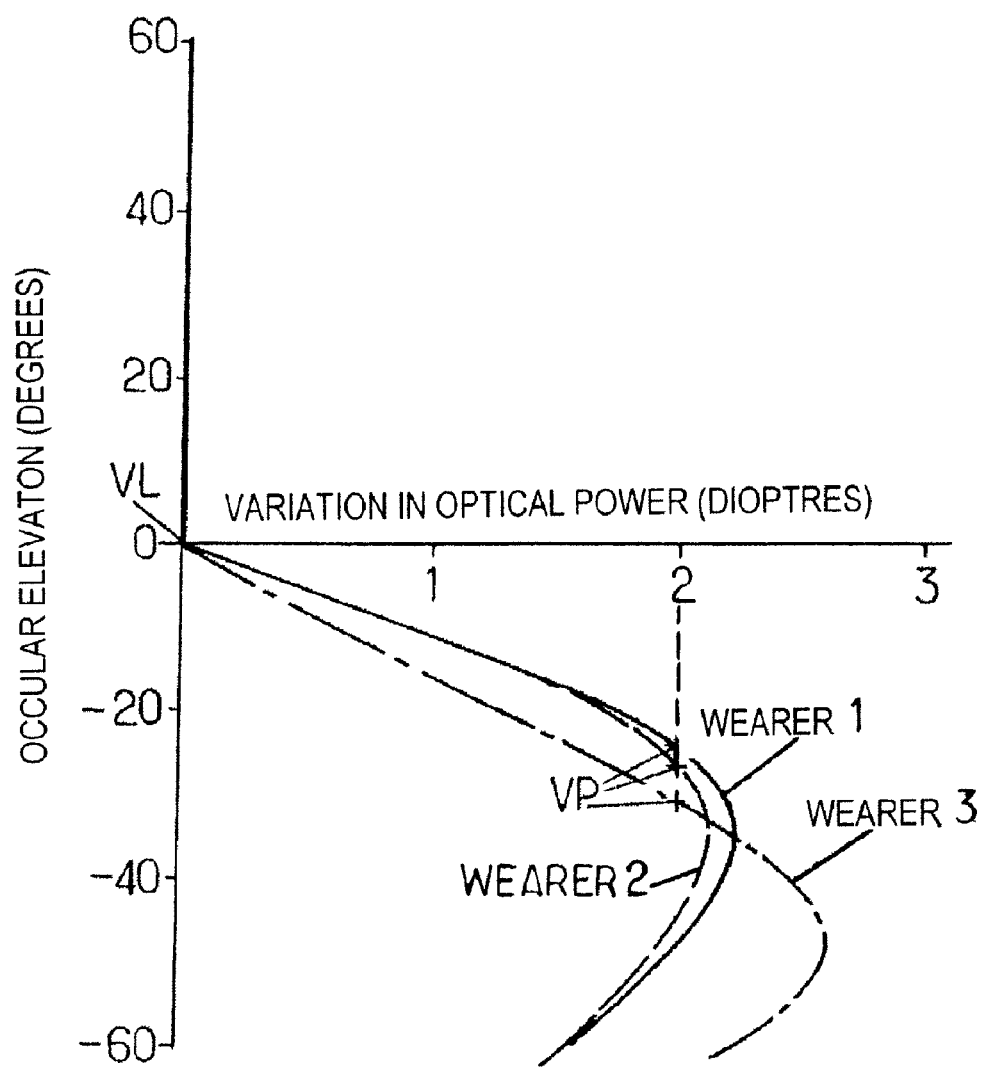
FIG. 4 is a diagram showing variations in the optical power of three progressive eyeglasses produced according to the invention.

FIG. 4 is a diagram that shows the respective variations in the optical power of three new progressive eyeglasses, which have been produced according to the invention for the three wearers of table 2. These variations in optical power are identified by following the principal meridian line of the eyeglasses, i.e. for gaze directions through these eyeglasses that vary in a vertical plane. The Y-axis marks the direction of gaze, according to the angle thereof with respect to the horizontal direction of gaze. The inventors state that, usually, the spectacle eyeglass is assembled in the spectacle frame so that this horizontal gaze direction passes through the eyeglass at the fitting cross. This fitting cross may also correspond to the direction that is taken as a reference for far vision. For this reason, it is denoted VL in the figure. Thus the Y-axis indicates the ocular elevation angle Y, expressed in degrees. The X-axis indicates the variation in optical power with respect to the horizontal gaze direction. It should be noted in particular that, for wearer 3, the optical power continues to increase beyond the addition value when the direction of gaze is lower than the reference direction for near vision, denoted VP. This adaptation of the eyeglass corresponds in particular to the habit of wearer 3 to lower his head only a little (low value of Pmean for Gt) with a reproducibility of inclination of his head that is high (low value of SD for Gt).

The new progressive eyeglass is then produced from the personalised design that has been calculated and selected, in a manner known to persons skilled in the art. In the particular embodiment of the invention that is described here, the semi-finished eyeglass is machined on its face other than the one that is created definitively during the mass production of semi-finished eyeglass.

Obviously the method of the invention that has just been described in detail may be modified in several aspects, while maintaining at least some of the advantages of the invention. In particular, the variations in the values Pmes that are measured for the wearer may be characterised by selecting the greatest of the absolute differences calculated between any two of these values, or the greatest of the differences between any one of the Pmes values that are measured and the corresponding mean value Pmean.

The invention claimed is:

1. Method of producing a new progressive spectacle eyeglass intended for a longsighted wearer, the method comprising the following steps:
/1/ obtaining a characterisation of a reference eyeglass that is compatible with an ophthalmic prescription drawn up for the wearer, said reference eyeglass having a design corresponding to a reference value (Pref) of at least one postural parameter, said postural parameter having variable values for distinct observation positions adopted by the wearer;
/2/ when the wearer is under ophthalmic correction conditions that were usual before the new progressive eyeglass is produced, measuring values (Pmes) of said postural parameter for said wearer during successive placements in observation position;
/3/ calculating a mean Pmean and a standard deviation SD of the values (Pmes) measured in step /2/, and a corrected mean Pcorr for said values measured in accordance with the formula:

$$Pcorr = Pmean - (Pmean - Pref) \times SD/K$$

Pref designating the reference value of the postural parameter and K being a non-zero constant;
/4/ depending on the corrected mean Pcorr calculated in step /3/, determining a design for the new progressive eyeglass; and
/5/ producing the new progressive eyeglass from the characterisation of the reference eyeglass, in accordance with the ophthalmic prescription and the design determined in step /4/;
method wherein the reference value Pref of the postural parameter and the constant K are respectively a mean value and a standard deviation of values of the postural parameter determined for a population sample.

2. Method according to claim 1, wherein the new progressive spectacle eyeglass is intended to replace an initial spectacle eyeglass used by the wearer, and wherein the ophthalmic correction conditions implemented in step /2/, usual before said new progressive eyeglass is produced, correspond to a use of said initial eyeglass.

3. Method according to claim 1, wherein the design of the new progressive eyeglass determined in step /4/ comprises a progression length and/or a function of variation of optical power along a meridian line of said new progressive eyeglass, said progression length and/or said function of variation of optical power being themselves variable according to the corrected mean Pcorr calculated at step /3/.

4. Method according to claim 1, wherein the design of the new progressive eyeglass is determined in step /4/ by performing the following two substeps:
/4-1/ determining an ergorama from the value of the corrected mean Pcorr calculated in step /3/, said ergorama associating an optical power value with each observation direction through the new progressive eyeglass; and
/4-2/ numerically optimising the new progressive eyeglass using at least part of the ergorama as an optimisation target.

5. Method according to claim 1, wherein step /4/ comprises a selection of the design of the new progressive eyeglass from a set of designs indexed by values (P) of the postural parameter, in accordance with the value of the corrected mean Pcorr calculated in step /3/.

6. Method according to claim 1, wherein the postural parameter is selected from a reading distance in near vision (Dvp), an angle of elevation or lowering of the eyes in near vision (Y), a horopter in near vision (H), or a ratio of participation of the head to a vertical gaze movement, or is derived from at least some of these parameters.

7. Method according to claim 1, wherein the population sample used for determining the reference value (Pref) of the postural parameter is a set of non-longsighted wearers placed in near vision condition.

8. Method according claim 1, also comprising a prior step of updating the reference value (Pref) of the postural parameter, on the basis of a new population sample increased with respect to a previous population sample from which a reference value was previously established for said postural parameter.

9. Method according to claim 1, wherein the postural parameter is a near-vision reading distance (Dvp), and the reference value (Pref) of said postural parameter is 348 mm.

10. Method according to claim 1, wherein the postural parameter is an angle of lowering of the eyes in near vision (Y), and the reference value (Pref) of said postural parameter is 22 degrees.

11. Method according to claim 1, wherein the postural parameter is a near-vision horopter (H), and reference value (Pref) of said postural parameter is 77.5 degrees.

12. Method according to claim 1, wherein the postural parameter is a ratio of participation of the head to a vertical gaze movement, and the reference value (Pref) of said postural parameter is 0.71.

13. Method according to claim 1, wherein the reference eyeglass is a semi-finished eyeglass having a final face, and the new progressive eyeglass is produced in step /5/ by machining another face of said semi-finished eyeglass.

* * * * *